United States Patent
Soundararajan et al.

(10) Patent No.: US 11,474,980 B1
(45) Date of Patent: Oct. 18, 2022

(54) CLOUD RESOURCE TAGGING AND INVENTORY

(71) Applicant: CITRIX SYSTEMS, INC., Fort Lauderdale, FL (US)

(72) Inventors: Sai Varun Prasanth Soundararajan, Raleigh, NC (US); Sindy Giraldo, Fort Lauderdale, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 107 days.

(21) Appl. No.: 17/137,315

(22) Filed: Dec. 29, 2020

(51) Int. Cl.
*G06F 16/21* (2019.01)
*G06Q 10/10* (2012.01)
*G06Q 10/08* (2012.01)
*G06F 16/28* (2019.01)
*H04L 67/10* (2022.01)
*G06F 16/22* (2019.01)
*H04L 67/51* (2022.01)

(52) U.S. Cl.
CPC ............ *G06F 16/212* (2019.01); *G06F 16/22* (2019.01); *G06F 16/285* (2019.01); *G06Q 10/087* (2013.01); *G06Q 10/105* (2013.01); *H04L 67/10* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 10,116,732 B1* | 10/2018 | Canton | H04L 41/0895 |
| 10,182,104 B1* | 1/2019 | Canton | H04L 41/0813 |
| 10,776,163 B1* | 9/2020 | Harris | G06F 9/5011 |
| 10,791,063 B1* | 9/2020 | Florissi | H04L 47/783 |
| 10,860,622 B1* | 12/2020 | Florissi | G06F 16/22 |
| 2019/0272572 A1* | 9/2019 | Gupte | H04L 67/1095 |
| 2021/0303413 A1* | 9/2021 | Chopra | G06F 11/1484 |

* cited by examiner

*Primary Examiner* — Quang N Nguyen
(74) *Attorney, Agent, or Firm* — Mintz Levin Cohn Ferris Glovsky and Popeo, P.C.

(57) ABSTRACT

Data characterizing a list of resources including a first resource within a first remote computing environment and a second resource within a second remote computing environment is received from a database separate from a plurality of remote computing systems. Metadata characterizing a first tag to be applied to the first resource and a second tag to be applied to the second resource is received. A data model of the resources is generated. The data model associates the first resource with the first tag and the second resource with the second tag. The data model is stored within a second database. Related apparatus, systems, techniques and articles are also described.

18 Claims, 6 Drawing Sheets

CLOUD RESOURCE TAGGING AND INVENTORY

TECHNICAL FIELD

The subject matter described herein relates to monitoring and managing the use of cloud resources.

BACKGROUND

Cloud computing can include the on-demand availability of computer system resources, especially data storage and computing power, without direct active management by the user. The term can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

In an aspect, data characterizing a list of resources including a first resource within a first remote computing environment and a second resource within a second remote computing environment is received from a database separate from a plurality of remote computing systems. Metadata characterizing a first tag to be applied to the first resource and a second tag to be applied to the second resource is received. A data model of the resources is generated. The data model associates the first resource with the first tag and the second resource with the second tag. The data model is stored within a second database.

One or more of the following features can be included in any feasible combination. For example, the first remote computing environment can include a first cloud resource provider and the second remote computing environment can include a second cloud resource provider different from the first cloud resource provider. The first remote computing environment can include an on premise computing environment. The database can form part of a services discovery platform including a service registry containing identities of available service instances and associated connection information for the available service instances within the plurality of remote computing systems, and new service instances, during or after instantiation, can register with the services registry. The data characterizing the list of resources can include a first identity associated with a first software application and a first identity of a host of the first software application. The data characterizing the list of resources can further include a second identity associated with a second software application and a second identity associated with a host of the second software application. The services discovery platform can be separate from the first host and separate from the second host. The first host can include a first entity operating and/or providing the first remote computing environment. The second host can include a second entity operating and/or providing the second remote computing environment. The first resource can include a virtual machine, a storage account, a web application, a database, and/or a virtual network.

The metadata can further characterize a cost center identity, a department name, a product name, an application name, a service name, an environment, a role, and/or a software version. The data model can be updated based on receiving data characterizing changes to the metadata and/or changes to at least one of the first resource or the second resource. The database can be maintained, and the maintaining can include using at least a services discovery agent to register new instantiations of services to the database. The database can form part of a service registry containing identities of available service instances and associated connection information for services within a computing infrastructure. An application programming interface configured to enable a user to provide new tags, modify existing tags, and identify resources associated with the first tag can be provided.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
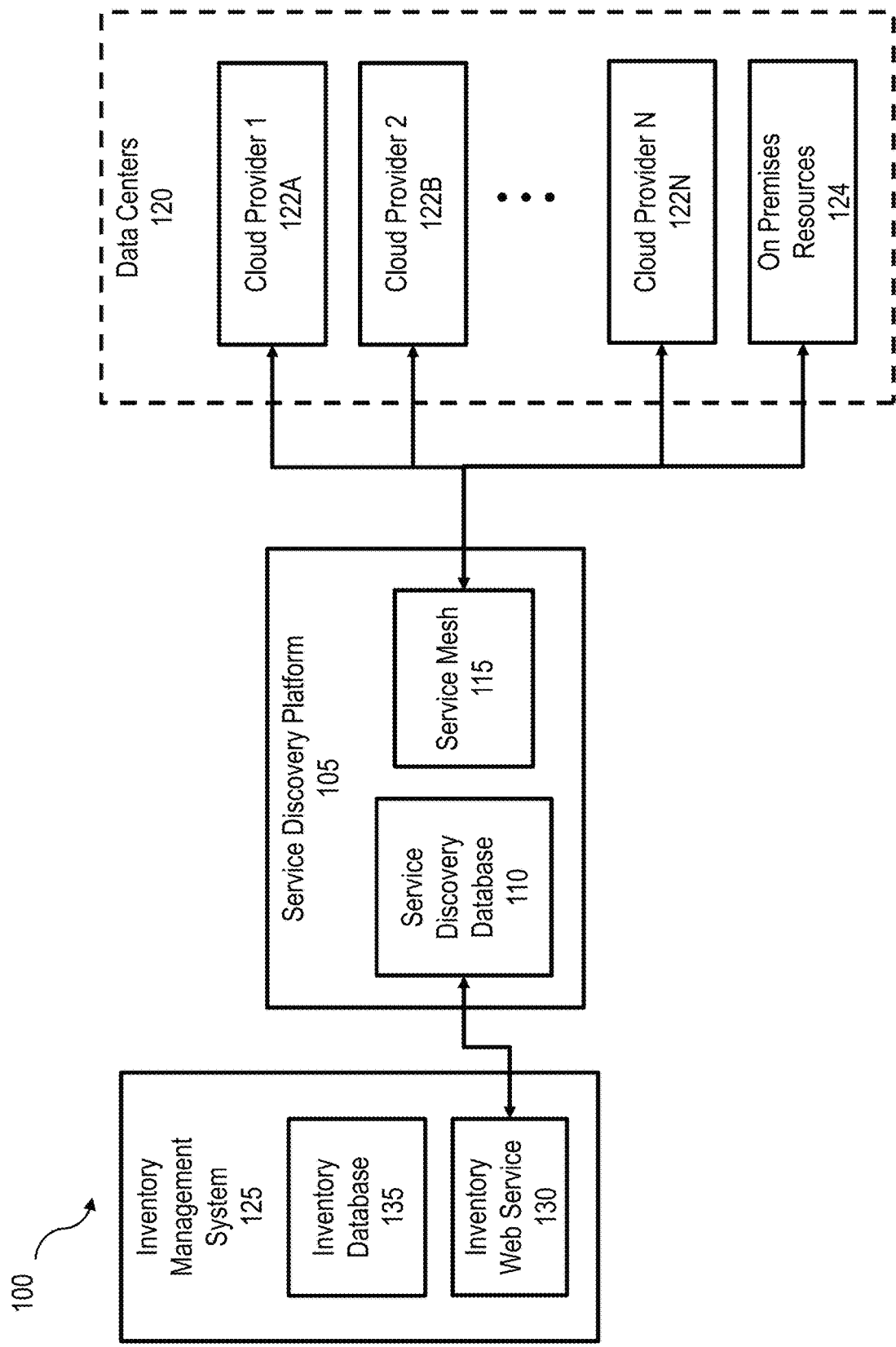
FIG. 1 is a system block diagram illustrating an example centralized tagging system according to some example implementations.

Cloud providers can provide a remote computing environment, for example, with virtual machine (VM) infrastructure such as a hypervisor using native execution to share and manage hardware, allowing for multiple environments which are isolated from one another, yet exist on the same physical machine. The computing environment can include an infrastructure as a service (IaaS) platform that provides application programming interfaces (APIs) to dereference low-level details of underlying network infrastructure. In such an IaaS platform, pools of hypervisors can support large numbers of VMs and include the ability to scale up and down services to meet varying needs. IaaS platforms can provide the capability to the user to provision processing, storage, networks, and other fundamental computing resources where the user is able to deploy and run arbitrary software, which can include operating systems and applications. The user may not manage or control the underlying cloud infrastructure but has control over operating systems, storage, and deployed applications; and possibly limited control of select networking components (e.g., host firewalls).

Companies with multiple software product offerings may utilize cloud computing resources for supporting those products. For example, a company may have many products being used by many business customers and millions of end users. Each product can include multiple services and each service can consume some amount of cloud resources as it executes (e.g., operates). For a Software-as-a-Service (SaaS) business, tagging (also referred to as labeling) of cloud and on-premises resources can be considered imperative for the security, management, and cost of deployed applications. Tagging a resource can include applying or associating a label with a resource for the purpose of managing that resource. For example, a resource such as a virtual machine can be tagged with a product name that the virtual machine supports. Tagging can include maintaining an association between the label and the resource (e.g., in the form of a table, as metadata, and the like).

But existing approaches to tagging of cloud and on-premises resources is inaccurate and inconsistent, which can result in inefficient enforcement of internal rules and results in manual (e.g., non-automated) workflows. For example, each cloud provider contains its own tagging information, the data management is complex since each cloud provider offers a different tagging strategy, the tag data may not be consistent between cloud providers, and some cloud providers limit the number of tags that can be associated with a given resource. Furthermore, governance of tagging of large scale systems that may operate across multiple cloud accounts and providers may be challenging. For example, tagging may require specific security access rights to cloud accounts (e.g., administrator privileges) and on-premises resources may not have tagging capabilities.

It can be impractical to manually track and label each resource with its associated product, such a manual approach requires specific knowledge of the cloud computing environment and may be inappropriate for dynamic resource management. And lacking knowledge of which resources support which products can lead to challenges in implementing security policies, identifying security flaws, tracking product usage for compliance purposes, and the like.

Accordingly, some implementations of the current subject matter include an approach to tag management in which, instead of fragmenting tagging across multiple cloud providers, a centralized inventory database and inventory web service provides cloud-provider-agnostic tagging capabilities. The centralized database, which may be separate (e.g., independent, remote, and different) from the one or more cloud providers, can store a data model that includes resource identities and their associated tags. The centralized database can be dynamically updated by a service discovery platform that can automatically detect devices and services on a computer network to create a dynamic and current inventory of resources for tagging. An API can be included and work with the centralized database to allow for tag control and management including adding, modifying, or deleting tags; providing historical tagging data; providing historical resource inventory data; providing the ability to analyze the tag and inventory data; and the like.

By utilizing a centralized database and associated web service, some implementations of the current subject matter can result in more accurate and consistent tagging of cloud and on-premises resources including efficient enforcement of internal rules and automated workflows. Moreover, resource management does not have to consider the complexity involved with each cloud provider containing its own tagging information, different tagging strategy, inconsistent tag data, and limits on the number of tags that can be associated with a given resource.

Furthermore, governance of tagging of large scale systems (which may operate across multiple cloud accounts and providers) can be achieved. For example, access privileges (e.g., administrator privileges) to cloud accounts may not be required and on-premises resources can be tagged and managed similar to cloud resources.

In some implementations, the current subject matter provides a mechanism by which tag management is centralized by leveraging a service discovery platform to provide updated and consistent tagging across some (if not all) cloud provider resources and/or on-premises resources. The use of a service discovery platform (which can perform automatic detection of devices and services offered by these devices on a computer network), enables some implementations to dynamically generate tags and an inventory of resources. Some implementations can leverage the resource name validated by the service discovery platform to associate resource data with business data, such as cost center data, department data, and the like. The services discovery platform can enable analysis of historical tagging data, analysis of historical resource inventory data, and enable additional insights into trends using the inventory data.

FIG. 1 is a system block diagram illustrating an example centralized tagging system 100 according to some example implementations that can include a centralized inventory database 135 and inventory web service 130 that can improve management of tagging of cloud resources across multiple cloud providers 122A-N, and/or on-premises resources 124.

The system 100 includes a service discovery platform 105 that includes a service discovery database 110 and a service mesh 115. The service mesh 115 includes a dedicated infrastructure layer for facilitating service-to-service communications between microservices. An example service mesh 115 can include Consul developed by Hashicorp, Inc. of San Francisco, USA. The service mesh 115 can provide observability into communications, secure connections, and/or automate retries and back off for failed requests.

The service mesh 115 is in communication with one or more datacenters 120 that can include cloud providers 122A-N and/or on-premises resources 124. Each of data centers 120 can include a remote computing system providing a remote computing environment and can provide resources (also referred to as virtual resources). The resources can include any manageable item that is available through a cloud provider such as virtual machines, storage accounts, web applications, databases, and virtual networks. Other resource types may be used as well.

Some (if not all) cloud or on-premises resources within datacenters 120 are registered to the service discovery platform 105. In some implementations, the service discovery platform 105 offering for an organization has all organization resources registered to provide uniform domain name service (DNS) resolution for microservices offered by the organization. Service discovery database 110 can include a service registry that includes a database of available service instances. Service discovery database 110 can contain a catalog of currently available instances of each service, their connection details, and corresponding host information (sometimes referred as nodes, e.g., entity in the cloud or on-premises). Services in an infrastructure registers themselves to the service registry and make themselves available for other services to communicate with.

In some implementations, any service that is deployed to a resource across any of data centers 120 (e.g., any cloud region, or on premises data center) in an infrastructure, is automatically registered to its service discovery platform through a service discovery agent. In some implementations, services registered to the service discovery platform 105 can use the following naming convention for its resolution productName-microserviceName-environment-service-.companyname. The naming convention can be utilized to automatically apply tags for a resource, for example, a resource can be automatically tagged with its product name, microservice name, environment type (e.g., production, development, test, and the like), service name, and company name.

Some implementations of the current subject matter includes an inventory management system 125 that leverages service discovery platform 105 to tag resources that come online and register to the service. Since some implementations of service discovery platform 105 can manage different workloads such as kubernetes (k8s), virtual machines, bare metal (e.g., single tenant) on-premises devices, and the like, the inventory management system 125 can utilize the services discovery platform 105 to enable a mapping between tags and resources in real time by ensuring the system is in contact with every cloud resource for every cloud provider.

To illustrate further, the inventory management system 125 can include an inventory web service 130 and an inventory database 135. The inventory database 135 can include tags (e.g., labels) for each resource and other metadata and the inventory web service 130 can provide for external access into the inventory database 135. Inventory management system 125 can periodically query the service discovery platform's 105 catalog for each datacenter 120. Inventory web service 130 can process the response data of the catalog to gather all services and its corresponding node information to generate an inventory. The inventory web service 130 can generate a data model for each catalog record and append the data model with business metadata, such as cost center number, department name, or the like. A data model can include a model or data structure that organizes elements of data and standardizes how they relate to one another and to the properties of real-world entities. For instance, a data model may specify that the data element representing a resource be composed of a number of other elements which, in turn, represent the business metadata such as a tag or label. The result of the data model can then be stored in the inventory database 135.

In some implementations, the inventory database 135 can be considered a snapshot of the cloud and on-premises resources, and that snapshot can be dynamically updated. For example, the service discovery platform 105 can maintain an up-to-date catalog of resources within services discovery database 110. The catalog can be considered dynamic in that the catalog can quickly change as resource instantiations are scaled up and/or down depending on demand. The inventory web service 130 can periodically query or poll the service discovery database 110 for modifications to the catalog. When the inventory web service 130 receives an update, the inventory web service 130 can modify any appropriate data model stored in the inventory database 135.

The inventory database 135 can be queried. For example, an API can be included at the database to enable a user to provide new tags, modify existing tags, update tagging rules, and identify the resources associated with a tag.

Some implementations can utilize Kubernetes for application deployment and management. Kubernetes can include an open-source container-orchestration system for automating computer application deployment, scaling, and management. With respect to Kubernetes workload inventory, a service registration for Kubernetes workloads works differently than other workloads such as virtual machines and bare metal servers. A service discovery agent runs as a Dameon Set in a Kubernetes cluster, which enforces an agent to be run on each node that gets created as part of the Kubernetes cluster. This ensures that every node and its corresponding pods are registered in the service discovery register catalog. Although Kubernetes is described in some examples, other orchestrations, such as Apache Mesos, Docker Swarm, and the like, can be used as well.

In some implementations, when a new service is deployed in an environment (e.g., a production environment), for example, as part of a boot up, the service registers itself to the service discovery platform. When the service registration happens, the service discovery has the metadata that identifies the service, and a tag metadata model can be derived from the registration payload, which is used for service registration to the service discovery system. The database of the service discovery platform can be utilized to derive tags for a particular service and store the tag to the inventory database. Accordingly, in some implementations, the tagging can be automatic as a result of service discovery. The service discovery platform can be relied upon to derive the tags and store it to the inventory database, which is accessible via the inventory API. Such implementations can removed the requirement for manual enforcements of tagging of resources.

The following are example payloads including service discovery platform 105 catalog response payload, inventory web service 130 response payload, and catalog entry examples per resource type. With respect to service discovery platform 105 catalog response payload, a payload response payload for a node can contain information for forming the metadata for the resource inventory.

TABLE 1

Service Discovery Platform Catalog Response Payload:
-workload_type: "Meta" field under the Services block has an attribute "deployment-type" contains the information of the type of workload. (e.g.: "deployment_type" : "k8s")
-ID : "ID" field under services block is a unique identifier which is usually the name of a product.(e.g.,: "ID": "product-name",
-Service: "Service" field in Service block is usually the name of the service.
Inventory Web Service Response Payload:
```
{
   "InventoryMetadata":
   {
   "Product": "Citrix Cloud",
   "Microservice": "Delegated Administration",
   "CostCenter": "10012"
      }
   "Node": "aks-citrix-00001.vm",
   "Address": "10.1.10.12",
   "Datacenter": "us-east",
   "TaggedAddresses": {
      "lan": "10.1.10.12",
      "wan": "10.1.10.12"
   },
   "instance_type": "DS2_V2"
}
```
Catalog Entry Examples (Kubernetes):
```
{
   "Node": {
      "ID": "40e4a748-2192-161a-0510-9bf59fe950b5",
      "Node": "aks-citrix-00001.vm",
      "Address": "10.1.10.12",
      "Datacenter": "us-east",
      "TaggedAddresses": {
         "lan": "10.1.10.12",
         "wan": "10.1.10.12"
      },
      "Meta": {
         "instance_type": "DS2_V2"
      }
   },
   "Services": {
      "consul": {
         "ID": "consul",
         "Service": "consul",
         "Tags": null,
         "Meta": {
            "deployment_type" : "k8s"
         },
         "Port": 8300
      },
      "login": {
         "ID": "citrix-cloud",
         "Service": "citrix-cloud-login",
         "TaggedAddresses": {
            "lan": {
               "address": "10.1.10.12",
               "port": 8000
            },
            "wan": {
               "address": "198.18.1.2",
               "port": 80
            }
         },
         "Tags": ["v1"],
         "Meta": {
            "redis_version": "4.0"
         },
         "Port": 8000,
         "Namespace": "default"
      },
      "billing": {
         "ID": "citrix-cloud",
         "Service": "citrix-cloud-billing",
         "TaggedAddresses": {
            "lan": {
               "address": "10.1.11.12",
               "port": 8001
            },
            "wan": {
               "address": "198.18.1.12",
               "port": 80
```

TABLE 1-continued

```
        }
      }
    }
  }
}
Catalog Entry Examples (Database):
{
  "Node": {
    "ID": "40e4a748-2192-161a-0510-9bf59fe950b5",
    "Node": "db-citrix-00001.cosmosdb",
    "Address": "10.1.10.12",
    "Datacenter": "us-east",
    "TaggedAddresses": {
      "lan": "10.1.10.12",
      "wan": "10.1.10.12"
    },
    "Meta": {
      "instance_type": "CosmosDB"
    }
  },
  "Services": {
    "consul": {
      "ID": "consul",
      "Service": "consul",
      "Tags": null,
      "Meta": {
        "deployment_type" : "database"
      },
      "Port": 8300
    },
  }
}
```

In some implementations, the services discovery platform 105 can utilize a hypertext transfers protocol (HTTP) layer health check for services. The HTTP layer health check can form part of the services mesh 115. The application-level health check can monitor the health of the services. If the application-level health check fails, the catalog can update the information that the service is down but the node is still up.

In some implementations, the services discovery platform 105 can utilize a gossip layer health check for nodes. An example services discovery platform 105 can utilize gossip protocol Serf, which operates on the transport layer to make sure the node is healthy and responding. If a node fails to respond to the gossip messages for over a period of time, then the service discovery platform 105 can update the catalog to indicate that both the node and its service(s) are down.

In some implementations, cloud resources can be tagged with their associated microservices, services, and/or products. A microservice can be considered as a set of code deployed to the cloud with a specific scoping to service a specific purpose. A service can be considered as a set of microservices that manifests as a feature or product. A set of one or more services can form a product. Thus a product can be considered to be formed of at least one service, and the at least one service can be considered to be formed of at least one microservice. Example products can include virtual applications, virtual desktops, and the like.

In some implementations, multiple products may utilize at least some of the same services (e.g., a service may belong to multiple products). A service or feature can also be provided separately (e.g., as an "add-on" to a product). In some implementations, multiple services and products may utilize at least some of the same microservices (e.g., a microservice may belong to multiple services and multiple products).

Figure 2:
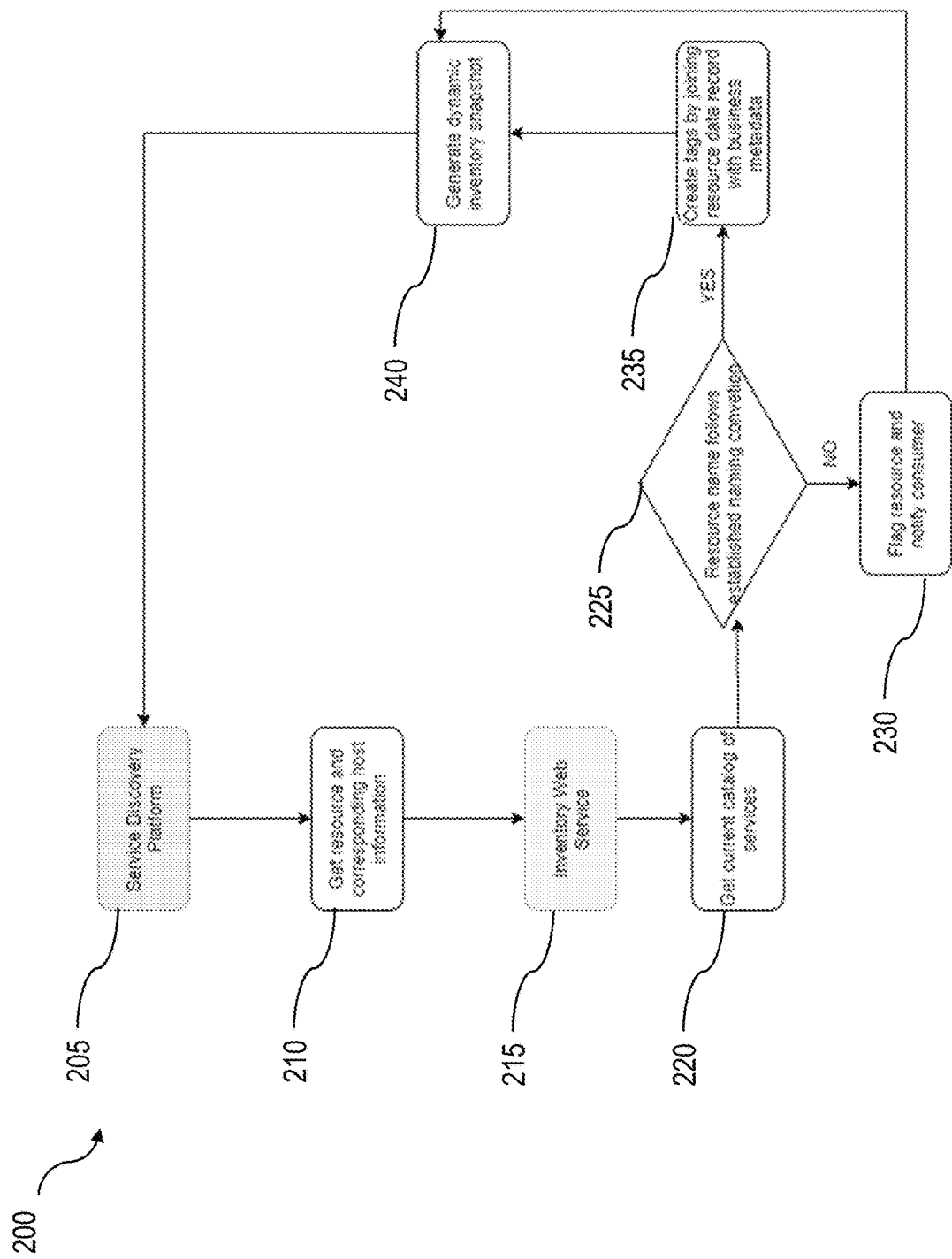
FIG. 2 illustrates an example process flow diagram illustrating an example process according to some example implementations.

FIG. 2 illustrates an example process flow diagram illustrating an example process 200 according to some example implementations of the current subject matter. At 205, microservices within an infrastructure register with a services discovery platform. Service discovery platform can include a service registry that includes a database including a catalog of currently available instances of each service, their connection details, and corresponding host information. Services in an infrastructure registers themselves to the service registry and make themselves available for other services to communicate with.

At 210, the service discovery platform maintains a current catalog including information regarding resource and corresponding host information in the registry. The current catalog information can be an up-to-date (e.g., real time) snapshot of microservices and associated resources that are present within the infrastructure (which may span multiple data centers and cloud providers).

At 215, the inventory web service queries or polls the service discovery platform for a current catalog. The query or poll can be periodic (e.g., regular, from time to time). At 220, the inventory web service receives the catalog information from the services discovery platform.

At 225, the inventory web service determines, for each resource, whether the resource name follows established naming convention. This can be a prespecific naming convention. By having the inventory web service enforce naming conventions, the naming convention enforcement can be centralized and management of resources across multiple data centers (e.g., cloud providers) can be efficiently performed.

If a resource name does not follow naming conventions, then at 230, the resource can be flagged as non-compliant and a consumer can be notified. If resource names are compliant, then at 235, the inventory web service can create tags by joining the resource data record (e.g., from the catalog) with business metadata. The business metadata can have been provided, for example, by a user or algorithm for management of tags. The tag can include, for example, a product, service, or microservice name. Other tags or labels may be used as well. In some implementations, the tags are created according to predefined tag rules established by an organization. Such an approach to tag management can centralize the tagging of resources, which does not require the tags to be applied on a per cloud provider basis.

At 240, a snapshot of the inventory can be generated and used, for example, for generating a list of all resources, their associated costs, and the like. The snap shot of the inventory can be useful, for example, for improving security policies, enabling policies to limit the number of resources thereby controlling costs, and the like. In some implementations, the dynamic inventory snapshot can enable determining cloud resource utilization metrics for a given product, which can enable upgrade or downgrade of the cloud resources, which can save cost per product. In some implementations, the snap shot of inventory can enable a cloud agnostic API for consumers to query resources they own across multiple cloud providers and/or on premises resources and regardless of region.

The process can return to 205, and the entire process 200 can repeat, for example, on a periodic basis or upon receiving an instruction to generate a current dynamic inventory snapshot.

Figure 3:
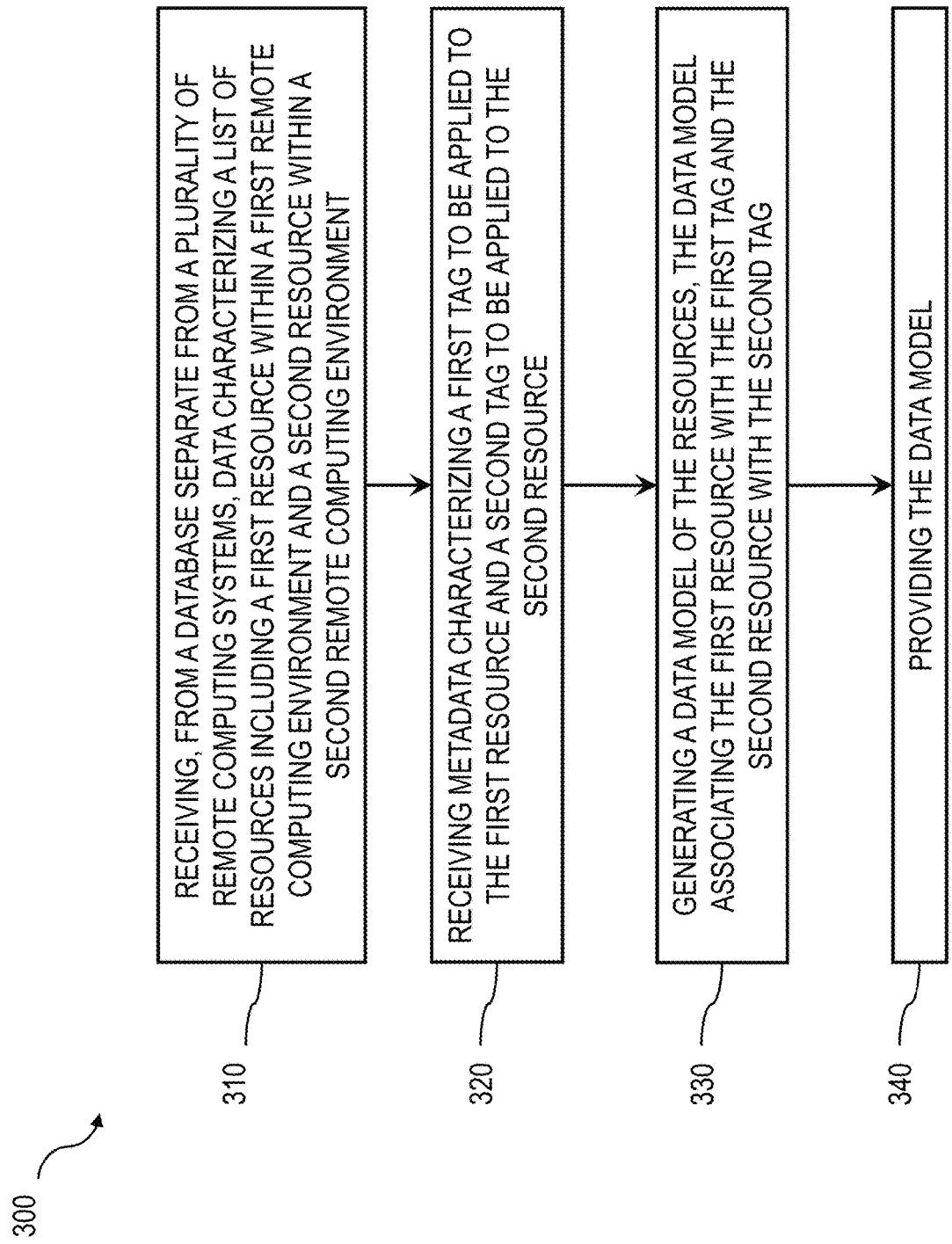
FIG. 3 is a process flow diagram illustrating an example process of generating a data model of resources across multiple data centers (e.g., cloud providers) that can enable centralized tagging of those resources according to some example implementations.

FIG. 3 is a process flow diagram illustrating an example process 300 of generating a data model of resources across multiple data centers (e.g., cloud providers) that can enable centralized tagging of those resources. The approach to centralized tagging of resources across multiple disparate data centers can provide for more efficient management of resources.

At 310, data characterizing a list of resources including a first resource within a first remote computing environment and a second resource within a second remote computing environment is received. The data can be received from a database separate from a plurality of remote computing systems. For example, the database can be remote, independent of, and/or operated by an entity different than the operators of the database. The resources can include a virtual machine, a storage account, a web application, a database, a virtual network, and/or the like.

The remote computing environments can include, for example, cloud systems such as MICROSOFT AZURE®, AMAZON WEB SERVICES® (AWS), and the like. For example, the first remote computing environment can include a first cloud resource provider and the second remote computing environment can include a second cloud resource provider different than the first cloud resource provider. In some implementations, the first remote computing environment includes an on premise computing environment, for example, a bare metal (e.g., single tenant) system.

The database can form part of a services discovery platform, for example, as described more fully above with respect to FIGS. 1 and 2. The database can form part of a services discovery platform including a service registry containing identities of available service instances and associated connection information for services within a computing infrastructure. New service instances, during or after instantiation, register with the services registry.

In some implementations, the data characterizing the list of resources includes a first identity associated with a first software application and a first identity of a host of the first software application. For example, the list of resources can include the identity of a first application (e.g., application #1) and an identity of the host of the first software application (e.g., AWS®). The list of resources can include a second identity associated with a second software application (e.g., application #2) and a second identity associated with a host of the second software application (e.g., AZURE®).

In some implementations, the services discovery platform is separate from the first host and separate from the second host. For example, if the first host includes a first entity operating and/or providing the first remote computing environment, and the second host includes a second entity operating and/or providing the second remote computing environment, then the services discovery platform is separate (e.g., independent of, remote from, and the like) the first and second entities.

At 320, metadata characterizing a first tag to be applied to the first resource and a second tag to be applied to the second resource is received. The first and second tags can include tags that have been provided previously (e.g., either directly by a user or by implementation of an organization specific tagging scheme). In some implementations, the metadata can include additional information such as a cost center identity, a department name, product name, application name, service name, environment, role, software version, and the like.

At 330, a data model of the resources can be generated. The data model can associate the first resource with the first tag and the second resource with the second tag. As noted above, a data model is a model or data structure that organizes elements of data and standardizes how they relate to one another and to the properties of real-world entities. For instance, a data model may specify that the data element representing a resource be composed of a number of other elements which, in turn, represent the business metadata such as a tag or label.

At 340, the data model is provided. Providing the data model can include providing an application programming interface configured to enable a user to provide new tags, modify existing tags or labels, and identify all resources associated with the first tag.

In some implementations, the data model is updated based on receiving changes to the metadata and/or changes to at least one of the first resource or the second resource. For example, if the first resource becomes inactive (e.g., unavailable), then the data model can be updated to reflect a current state or inventory of all resources under management. Similarly, the data model can be updated based on a new resource being instantiated.

In some implementations, a services discovery agent is utilized to register new instantiations of services to the database thereby maintaining the database, which forms part of a service registry containing identities of available service instances and associated connection information for services within a computing infrastructure.

Figure 4:
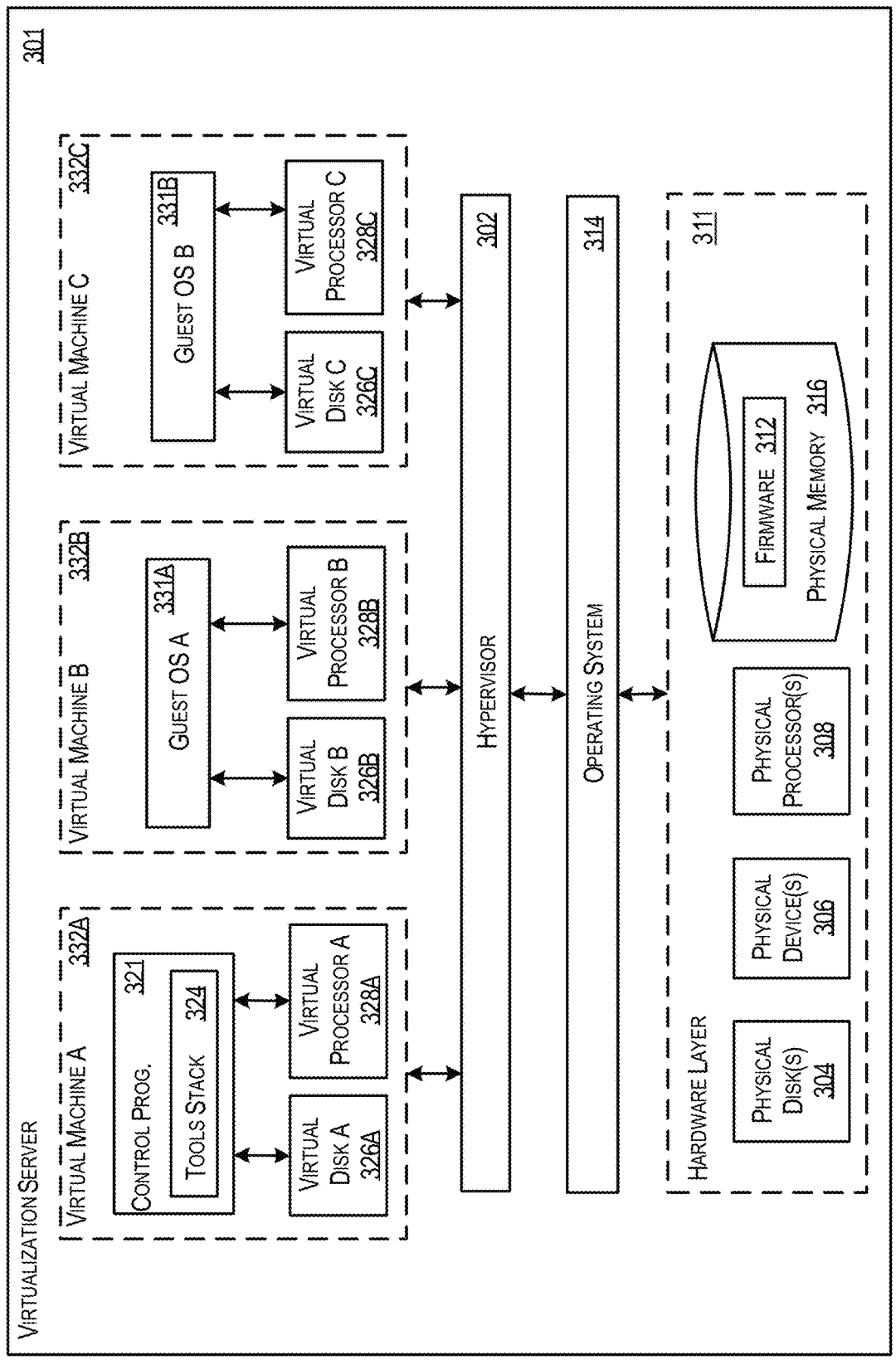
FIG. 4 shows a high-level architecture of an illustrative virtualization system contained within a datacenter including one or more resources as referenced and described with respect to FIG. 1 according to some example implementations.

FIG. 4 shows a high-level architecture of an illustrative virtualization system, for example, contained within a datacenter 120 including one or more resources as referenced and described with respect to FIG. 1. As shown, the virtualization system may be a single-server or multi-server system, or a cloud system, including at least one virtualization server 301 configured to provide virtual desktops and/or virtual applications to one or more client access devices 102a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 may be deployed as and/or implemented by one or more embodiments of server 106 illustrated in FIG. 5A or by other known computing devices. Included in virtualization server 301 is hardware layer 311 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 321 that includes tools stack 324. Control program 321 may be referred to as a control virtual machine, Domain 0, Dom0, or other virtual machine used for system administration and/or control. In some embodiments, one or more virtual machines 332B-C may execute, using virtual processor 328B-C, guest operating system 331A-B (generally 331).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 311 may include any type of memory. Physical memory 316 may store data, and in some embodiments may store one or more programs, or set of executable instructions. In the illustrated embodiment, firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 311. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 331 or control programs 321 executing on virtual machines 332 in any manner that simulates operating systems 331 or control programs 321 having direct access to system resources. System resources can include, but are not limited to, physical devices 306, physical disks 304, physical processors 308, physical memory 316, and any other component included in hardware layer 311 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 331 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 331 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 331 within virtual machine 332. In still other embodiments, virtual machine 332 may execute guest operating system 331.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 311). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

The virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While the illustrated embodiment is one where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

Figure 5A:
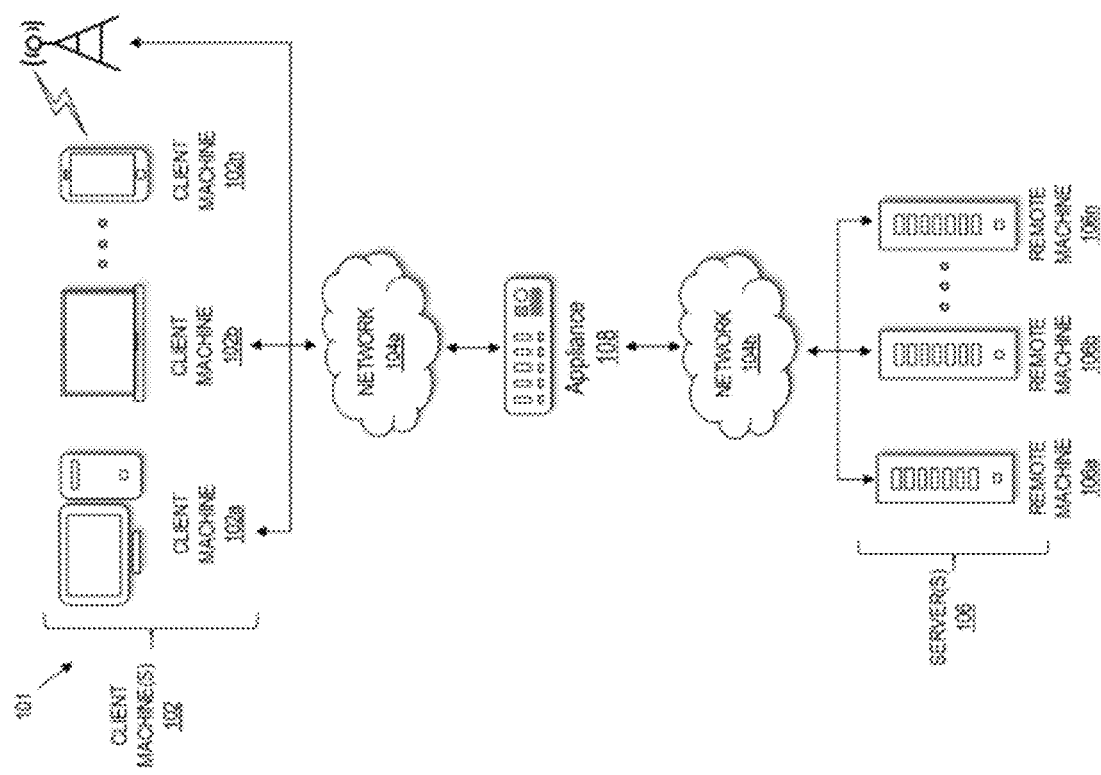
FIG. 5A depicts a network diagram illustrating an example of a network environment according to some example implementations.

FIG. 5A depicts a network diagram illustrating an example of a network environment 101. The network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can communicate with the remote machines 106a-106n via an appliance 108. The illustrated appliance 108 is positioned between the networks 104a and 104b, and can also be referred to as a network interface or gateway. The appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. Multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. The client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

The server 106 can execute a remote presentation services program or other program that uses a thin-client or a remote-display protocol to capture display output generated by an application executing on a server 106 and transmit the application display output to a client 102.

The server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106. The virtual machine can be deployed within a cloud provider.

The network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 5B:
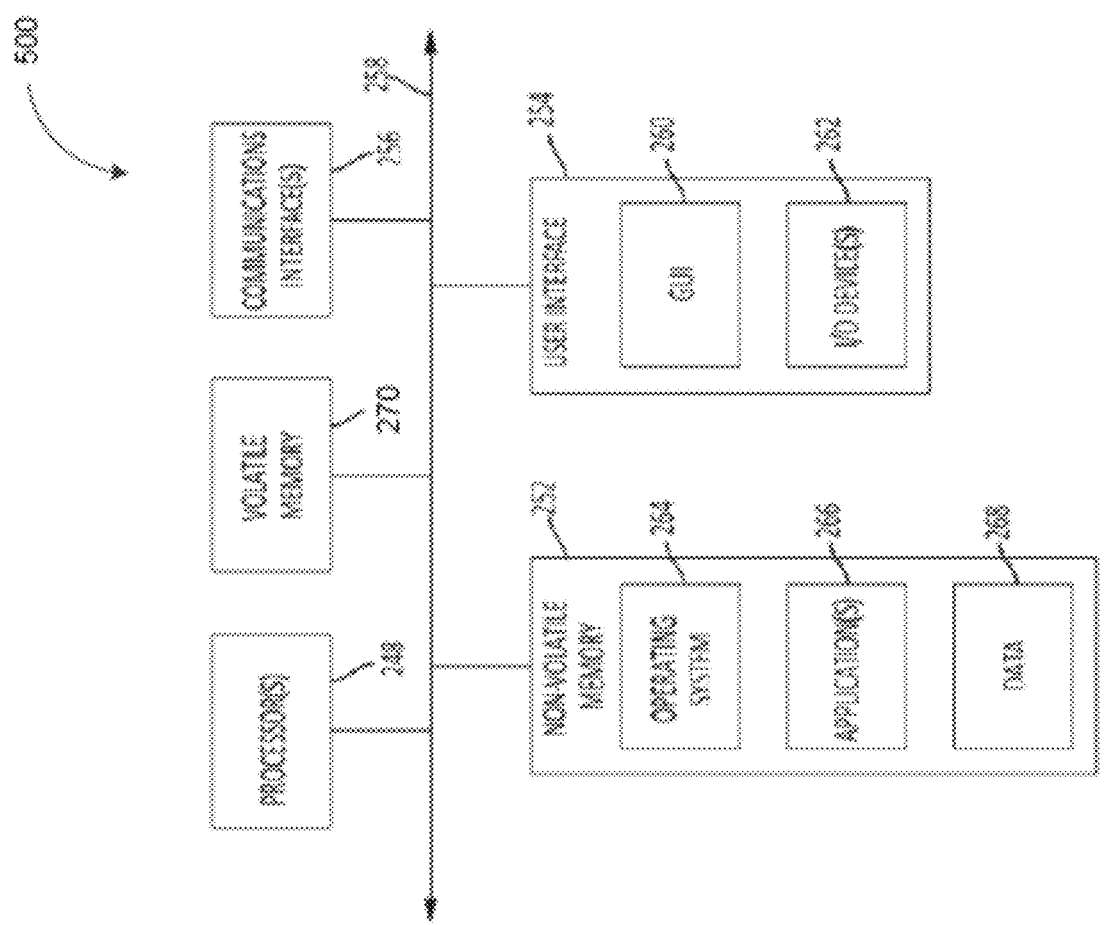
FIG. 5B depicts a block diagram illustrating an example of a computing device according to some example implementations.

FIG. 5B depicts a block diagram illustrating an example of a computing device 500, in accordance with some example embodiments. Referring to FIGS. 5A-B, the computing device 500 can be useful for practicing an embodiment of the clients 102, the servers 106, and/or the appliances 108.

The computing device 500 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 500 can communicate via communication the bus 258. The computing device 500 is shown merely as an example, as the clients 102, the servers 106, and the appliances 108 can be implemented by any computing or processing environment and with any type of machine or set of machines that can have suitable hardware and/or software capable of operating as described herein.

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method comprising:
receiving, from a database separate from a plurality of remote computing systems, data characterizing a list of resources including a first resource within a first remote computing environment and a second resource within a second remote computing environment;
receiving metadata characterizing a first tag to be applied to the first resource and a second tag to be applied to the second resource;
generating a data model of the resources, the data model associating the first resource with the first tag and the second resource with the second tag;
storing the data model within a second database;
updating the data model based on receiving data characterizing changes to the metadata and/or changes to at least one of the first resource or the second resource;
maintaining the database, wherein the maintaining includes using at least a services discovery agent to register new instantiations of services to the database, the database forming part of a service registry containing identities of available service instances and associated connection information for services within a computing infrastructure.

2. The method of claim 1, wherein the first remote computing environment includes a first cloud resource provider and the second remote computing environment includes a second cloud resource provider different from the first cloud resource provider.

3. The method of claim 1, wherein the first remote computing environment includes an on premise computing environment.

4. The method of claim 1, wherein the database forms part of a services discovery platform including a service registry containing identities of available service instances and associated connection information for the available service instances within the plurality of remote computing systems, wherein new service instances, during or after instantiation, register with the services registry.

5. The method of claim 4, wherein the data characterizing the list of resources includes a first identity associated with a first software application and a first identity of a host of the first software application; wherein the data characterizing the list of resources further includes a second identity associated with a second software application and a second identity associated with a host of the second software application.

6. The method of claim 5, wherein the services discovery platform is separate from the first host and separate from the second host, the first host including a first entity operating and/or providing the first remote computing environment, the second host including a second entity operating and/or providing the second remote computing environment.

7. The method of claim 1, wherein the first resource includes a virtual machine, a storage account, a web application, a database, and/or a virtual network.

8. The method of claim 1, wherein the metadata further characterizes a cost center identity, a department name, a product name, an application name, a service name, an environment, a role, and/or a software version.

9. The method of claim 1, further comprising providing an application programming interface configured to enable a user to provide new tags, modify existing tags, and identify resources associated with the first tag.

10. A system comprising:
at least one data processor: and
memory storing instructions which, when executed by the at least one data processor, causes the at least one data processor to perform operations comprising:
receiving, from a database separate from a plurality of remote computing systems, data characterizing a list of resources including a first resource within a first remote computing environment and a second resource within a second remote computing environment;
receiving metadata characterizing a first tag to be applied to the first resource and a second tag to be applied to the second resource;
generating a data model of the resources, the data model associating the first resource with the first tag and the second resource with the second tag;
storing the data model within a second database;
updating the data model based on receiving data characterizing changes to the metadata and/or changes to at least one of the first resource or the second resource;
maintaining the database, wherein the maintaining includes using at least a services discovery agent to register new instantiations of services to the database, the database forming part of a service registry containing identities of available service instances and associated connection information for services within a computing infrastructure.

11. The system of claim 10, wherein the first remote computing environment includes a first cloud resource provider and the second remote computing environment includes a second cloud resource provider different from the first cloud resource provider.

12. The system of claim 10, wherein the first remote computing environment includes an on premise computing environment.

13. The system of claim 10, wherein the database forms part of a services discovery platform including a service registry containing identities of available service instances and associated connection information for the available service instances within the plurality of remote computing systems, wherein new service instances, during or after instantiation, register with the services registry.

14. The system of claim 13, wherein the data characterizing the list of resources includes a first identity associated with a first software application and a first identity of a host of the first software application; wherein the data characterizing the list of resources further includes a second identity associated with a second software application and a second identity associated with a host of the second software application.

15. The system of claim 14, wherein the services discovery platform is separate from the first host and separate from the second host, the first host including a first entity operating and/or providing the first remote computing environment, the second host including a second entity operating and/or providing the second remote computing environment.

16. The system of claim 10, wherein the first resource includes a virtual machine, a storage account, a web application, a database, and/or a virtual network.

17. The system of claim 10, wherein the metadata further characterizes a cost center identity, a department name, a product name, an application name, a service name, an environment, a role, and/or a software version.

18. A non-transitory computer readable medium storing instructions which, when executed by at least one data processor forming part of at least one computing system, causes the at least one data processor to perform operations comprising:
- receiving, from a database separate from a plurality of remote computing systems, data characterizing a list of resources including a first resource within a first remote computing environment and a second resource within a second remote computing environment;
- receiving metadata characterizing a first tag to be applied to the first resource and a second tag to be applied to the second resource;
- generating a data model of the resources, the data model associating the first resource with the first tag and the second resource with the second tag;
- storing the data model within a second database;
- updating the data model based on receiving data characterizing changes to the metadata and/or changes to at least one of the first resource or the second resource;
- maintaining the database, wherein the maintaining includes using at least a services discovery agent to register new instantiations of services to the database, the database forming part of a service registry containing identities of available service instances and associated connection information for services within a computing infrastructure.

* * * * *